K. W. BARTLETT.
LIQUID TREATING APPARATUS.
APPLICATION FILED JUNE 27, 1910.
1,017,729.
Patented Feb. 20, 1912.
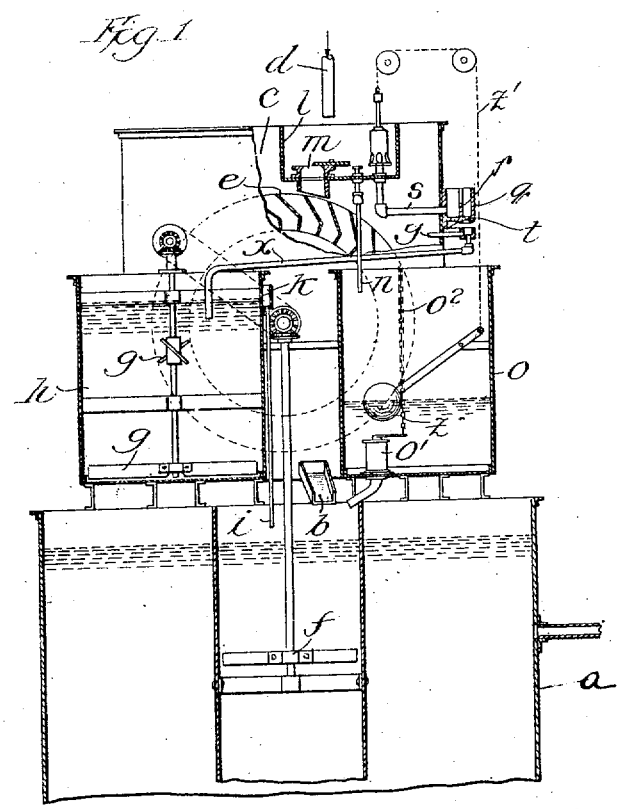
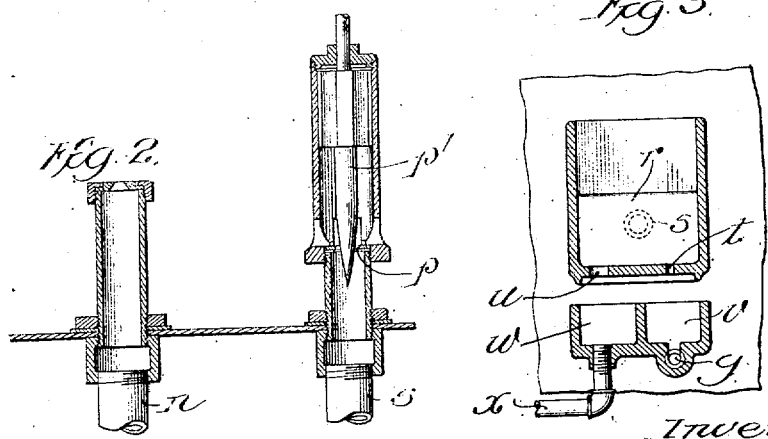
Witnesses:
Inventor
Kent W. Bartlett,
By G. L. Gragg
Atty.

UNITED STATES PATENT OFFICE.

KENT W. BARTLETT, OF CHICAGO, ILLINOIS.

LIQUID-TREATING APPARATUS.

1,017,729.  Specification of Letters Patent.  Patented Feb. 20, 1912.

Application filed June 27, 1910. Serial No. 568,984.

*To all whom it may concern:*

Be it known that I, KENT W. BARTLETT, citizen of the United States, residing at Chicago, in the county of Cook and State of Illinois, have invented a certain new and useful Improvement in Liquid-Treating Apparatus, of which the following is a full, clear, concise, and exact description, reference being had to the accompanying drawings, forming a part of this specification.

My invention relates to liquid treating apparatus and is of particular services when used in softening water.

The invention will be described by reference to the accompanying drawing showing the preferred embodiment thereof, in which—

Figure 1 is a view in sectional elevation, with some parts broken away, of the preferred form of my invention; Fig. 2 is a vertical sectional view on a larger scale of a part of the mechanism shown in Fig. 1; and Fig. 3 is a vertical sectional view on a larger scale of another part of the mechanism shown in Fig. 1.

Like parts are indicated by similar characters of reference throughout the different figures.

The settling tank $a$ is of any well known or suitable construction. The water that is to be treated flows from the spout $b$ into the settling tank, this spout communicating with the interior of a water wheel casing $c$ into which water is admitted from a pipe $d$ communicating with any suitable source of supply. An overshot water wheel $e$ is located within the casing so as to be impinged upon by the water just after it issues from the pipe $d$, this water wheel driving an agitator $f$ in the settling tank and agitators $g$ in a chemical tank $h$ in a manner which is well known by those skilled in the art. The chemical is supplied to the settling tank through an admission pipe $i$ that is in communication with an overflow opening $k$ in the chemical tank, this overflow opening determining the upper limiting level of the chemical in the chemical tank.

The water flowing from the pipe $d$ enters into a distributing box $l$. A part of the water flows from the distributing box through an adjustable orifice $m$ that directs this part of the water onto the overshot water wheel, whereby power is developed for operating the agitators $f$ and $g$, this water flowing through the spout $b$ as has been described. Another portion of the water flows from the distributing box through a pipe $n$ which directs this second part of the water into a float tank $o$. A third part of the water flows through a valved opening $p$ into a dividing box $q$, a baffle wall $r$ facing the pipe $s$ that conveys the water from the opening $p$ so as to prevent the water from surging as it enters the dividing box. The only outlet for the water to the left of the baffle wall, as seen in Fig. 1, is over the baffle wall, the water flowing over this baffle wall into the space to the right thereof where it is comparatively free of surging action. The portion of the bottom of the dividing box upon the right of the baffle wall $r$, as seen in Fig. 1, is provided with two apertures $t$ and $u$ (see Fig. 3) which overlie two chambers $v$ and $w$. The chamber $w$ is in communication with the chemical tank $h$ by way of a pipe $x$ leading from the bottom of said chamber. The chamber $v$ is in communication with the water wheel casing by means of a pipe $y$, the water flowing through said chamber $v$ and pipe $y$ finding access to the settling tank by way of the spout $b$. The elements $q$, $r$, $t$, $u$, $v$, $w$ and $y$ are supplied for engineering conveniences and are not absolutely indispensable, it being only essential to provide a path for the water from the valved opening $p$ to the chemical tank $h$. The amount of water that flows through the valved opening $p$ is automatically regulated by a suitable regulating valve $p'$ that automatically varies the carrying capacity of the orifice $p$. The valve $p'$ is regulated in its operation by a float $z$ that is connected with the valve $p'$ by a valve cord or chain $z'$ passing over suitable pulley mechanism. The orifice $m$ and the admission orifice in the pipe $n$ have certain predetermined fixed areas, while the orifice $p$ is automatically regulable in size as has been set forth.

The water flows into the chemical tank by way of the pipe $x$ and occasions overflow of the fluid in the chemical tank into the settling tank through the chemical discharge orifice $k$. The water flowing through the pipe $x$ is untreated water which obviously will weaken the chemical in the chemical tank, and in order to compensate for the reduction in the strength of the chemical in the chemical tank, the supply of water flowing through the pipe $x$ is increased in proportion to the water flowing into the settling tank, this supply constantly increasing as the water is admitted to the settling tank. This result is accomplished by the portion of the water admitted through the pipe $n$ into the float tank $o$, the rising water in said float tank elevating the float $z$ and correspondingly withdrawing the valve $p'$ from the opening $p$ correspondingly to enlarge the opening $p$, the enlargement of said opening constantly progressing so as constantly to increase the volume of water flowing through the pipe $x$ and thereby constantly to increase the volume of fluid flowing through the discharge orifice $k$ into the settling tank to compensate for the reduction in the strength of the chemical flowing from the chemical tank into the settling tank.

One important feature of my present invention is the provision of a fixed flow of water through the admission device $n$ so that the float $z$ rises at a rate which is proportional to the water flowing into the settling tank, whereby a constant factor is determined with which to calculate the automatic adjustment of the valve $p'$. Another feature of my invention resides in the tapered formation of the valve $p'$, which tapered formation is designed so to vary the size of the opening $p$ as to furnish an increasing volume of water through the pipe $x$ to the chemical tank $h$ properly to compensate for the reduction in the strength of the chemical in the chemical tank $h$.

I have shown a valve structure $o'$ which may be manually operated by a chain $o^2$ in order to empty the water from the float tank into the settling tank when the water in said float tank has reached an upper limiting level, thereby to permit the float mechanism to begin another cycle of adjusting operations.

In my application Serial No. 566,514, filed June 13, 1910, I have broadly claimed apparatus for accomplishing the results which are accomplished by the apparatus of my present case, the present apparatus, in its preferred embodiment, being an improvement upon the apparatus of my said co-pending application.

While I have herein shown and particularly described the preferred embodiment of my invention, I do not wish to be limited to the precise details of construction shown, as changes may readily be made without departing from the spirit of the invention, but,

Having thus described my invention, I claim as new and desire to secure by Letters Patent the following:—

1. A liquid treating apparatus, including a settling tank; a chemical tank; a float tank; independent means for conveying liquid to the chemical and float tanks; mechanism for effecting increasing flow of liquid into the chemical tank to displace liquid in the chemical tank and cause the increased flow thereof from the chemical tank to compensate for the reduction of strength of the chemical in the chemical tank; and float mechanism in the float tank governing the aforesaid mechanism.

2. A liquid treating apparatus, including a settling tank; a chemical tank; a regulating tank; independent means for conveying liquid to the chemical and regulating tanks; mechanism for effecting increasing flow of liquid into the chemical tank to displace liquid in the chemical tank and cause the increased flow thereof from the chemical tank to compensate for the reduction of strength of the chemical in the chemical tank; and regulating mechanism governed by the liquid in the regulating tank and in turn governing the operation of the aforesaid mechanism.

3. A liquid treating apparatus, including a settling tank; a chemical tank; independent means for effecting passage of two streams of liquid, one of which flows into the chemical tank; mechanism for effecting increasing flow of liquid into the chemical tank to displace liquid in the chemical tank and cause the increased flow thereof from the chemical tank to compensate for the reduction of strength of the chemical in the chemical tank; and mechanism governed by the stream of liquid companion to that which flows into the chemical tank and in turn governing the aforesaid mechanism.

4. A liquid treating apparatus, including a settling tank; a chemical tank; means for conveying liquid to the chemical tank; a tapered plug valve for governing the volume of liquid flowing to the chemical tank; and liquid-operated mechanism operating the tapered plug valve to cause said valve to admit an increasing volume of liquid into the chemical tank to displace liquid in the chemical tank and cause the increased flow thereof from the chemical tank to compensate for the reduction of strength of the chemical in the chemical tank.

In witness whereof, I hereunto subscribe my name this 24th day of June, A. D., 1910.

KENT W. BARTLETT.

Witnesses:
G. L. CRAGG,
R. E. ATHERTON.